July 30, 1946.　　A. R. VAN C. WARRINGTON　　2,405,083
OUT-OF-STEP RELAY ARRANGEMENT
Filed Oct. 6, 1944

Inventor:
Albert R van C. Warrington,
by Harry E. Dunham
His Attorney.

Patented July 30, 1946

2,405,083

UNITED STATES PATENT OFFICE 2,405,083

OUT-OF-STEP RELAY ARRANGEMENT

Albert R. van C. Warrington, Wallingford, Pa., assignor to General Electric Company, a corporation of New York Application October 6, 1944, Serial No. 557,431

9 Claims. (Cl. 175—294)

My invention relates to out-of-step relay arrangements and particularly to such arrangements which distinguish between an out-of-step condition in an alternating current system and either a fault or a power swing which does not produce an out-of-step condition.

One object of my invention is to provide a new and improved out-of-step relay arrangement which responds during the first slip cycle of the out-of-step condition.

Another object of my invention is to provide a new and improved out-of-step relay arrangement which may be readily connected to an alternating current power system at any point thereof to effect a control operation at said point upon the occurrence of an out-of-step condition and irrespective of the location of the electrical center of the system.

My invention will be better understood from the following description when taken in connection with the accompanying drawing, and its scope will be pointed out in the appended claims.

Figure 1:
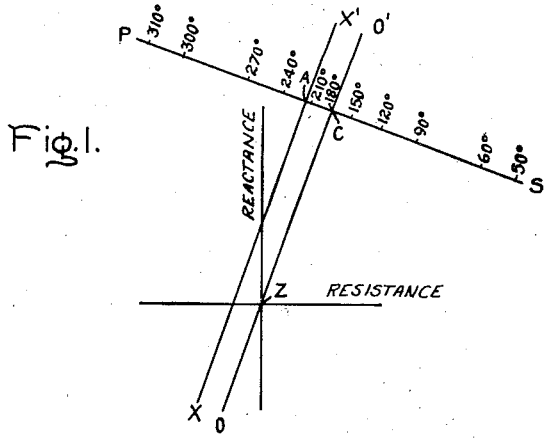
Figure 2:
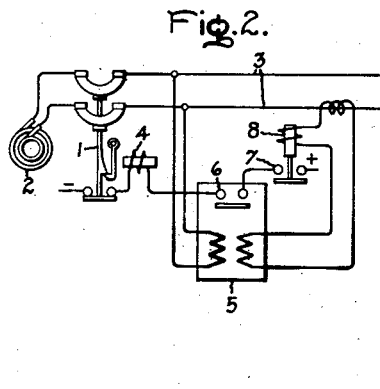
Figure 3:
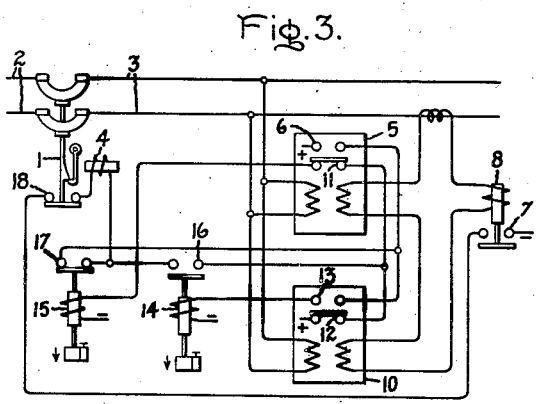
Figure 4:
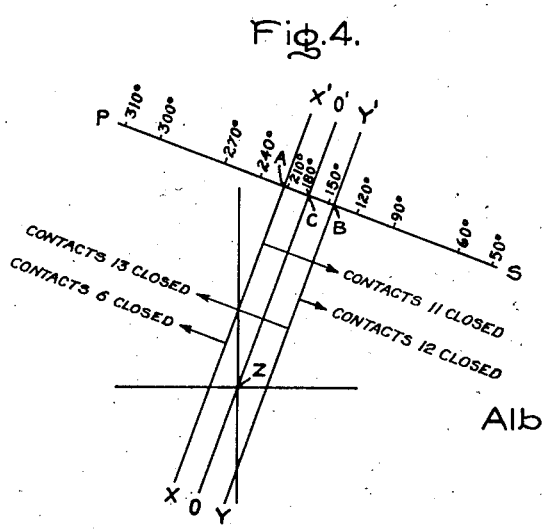

In the accompanying drawing, Fig. 1 is an explanatory vector diagram; Fig. 2 diagrammatically illustrates a circuit breaker control arrangement embodying my improved out-of-step relay arrangement; Fig. 3 is a modification of the embodiment shown in Fig. 2; and Fig. 4 is an explanatory vector diagram.

Fig. 1 is a polar impedance diagram in which resistance is measured along one axis and reactance along the other. It has been found that, if the voltage measured at a given point on an alternating current system be divided by the current measured in the system at the same location, the impedance quotient has a value which depends on the angle between the generated voltages at the ends of the system. When plotted on a resistance-reactance diagram such as Fig. 1, the locus of this varying impedance is a circle of large diameter compared with the fault impedance of a section of the system. In fact, if the generated voltages are equal and all shunt impedances are neglected, the circle is of infinite diameter, i. e., a straight line which is at right angles to the fault impedance characteristic of the system and which intersects the fault impedance characteristic at the electrical center.

On account of the large diameter of the circle, the part of it that falls within the impedance characteristics of ohm relays plotted on the same polar impedance diagram is substantially a straight line. Hence it is usual to draw this power swing impedance locus of the system as a straight line PS when considering the behavior of ohm relays, though of course it is recognized that the ends of the straight line must join at the zero current position.

When an alternating current system is in a state of oscillation or power swing, the impedance seen by an ohm relay connected to the system moves along the power swing impedance locus of the system in a simple harmonic motion on each side of the point on the locus corresponding to the impedance seen by the relay before the disturbance occurred. For example, when a disturbance such as a fault between phases occurs on the system, it tends to cause the angular displacement of the synchronous machines at the ends of the system to change to a different value from what it was before the disturbance occurred. In changing to this new angular displacement, the machines usually overshoot so that the angular displacement then has to be changed in the opposite direction. In this manner, an oscillating impedance is seen by the ohm relay until the machines have settled down to the new angular displacement.

As the phase displacement of the synchronous machines at the ends of the system approaches 180°, the torque tending to maintain them in synchronism decreases. Therefore, if the disturbance is of such a character as to cause the angular displacement to approach 180°, the angular displacement of the machines continues to increase and the impedance value seen by the relay continues around the power swing impedance locus in a given direction depending upon the direction of power flow between the machines. Under such a condition the system is out-of-step. If the machines recover before the phase displacement reaches 180°, the machines oscillate about the new position of equilibrium as above described and settle there after the oscillation has been damped out by friction and power losses.

In order for a distance relay to be operated by an out-of-step condition in an alternating current system to which the relay is connected, the impedance characteristic of the relay must be such that on the resistance-reactance polar diagram for the system the relay characteristic intersects the power swing impedance locus of the system. If this intersection occurs at a point on the power swing locus corresponding to a phase angle displacement of the system terminal voltages which occurs only when an out-of-step condition exists in the system, it is evident that a power swing which does not result in a sufficient phase displacement of the terminal voltages to produce an out-of-step condition will not effect an operation of the distance relay. Furthermore, if the impedance characteristic of a relay is such that it is substantially parallel to and only slightly displaced from the fault impedance characteristic of the system, the relay will not be operated under normal load conditions as long as the power flow at the point where the relay is connected is in a predetermined direction. For example, let it be assumed that in Fig. 1 the line OO' represents the fault impedance characteristic of an electric power system, the line PS represents the power swing locus which intersects the impedance characteristic OO' at the electrical center of C of the system, and the line XX' represents the impedance characteristic of a known type of ohm relay connected to the system at a given point thereof such as Z. As shown in Fig. 1, the impedance characteristic XX' intersects the power swing impedance locus PS at a given point A which corresponds to a phase displacement of the system terminal voltages of about 210° when the flow of power at the point where the relay is connected is in one direction and to a phase displacement of about 150° when the flow of power is in the opposite direction. Since such phase displacements only occur during an out-of-step condition, it is evident that an operation of the distance relay having the characteristic XX' is effected by an out-of-step condition in the system but is not effected under normal operating conditions or power swings which do not result in the system falling out of step because, under such stable operating conditions, the phase displacement of the terminal voltages never exceeds 90°.

As is known to those skilled in the art, the power swing impedance characteristic PS is in reality a circle having a very large diameter and that it also intersects the ohm relay impedance locus XX' at another point which corresponds to a small angular displacement of the system terminal voltages. Therefore, during an out-of-step condition, an operation of the ohm relay occurs at a time when the phase displacement of the system voltages and consequently the resulting power flow in the system, is low if at such a time sufficient energy is supplied to the relay to effect the operation thereof and a reverse operation of the ohm relay occurs at a time when the phase displacement is large and consequently the resulting power flow in the system is also large and sufficient energy is supplied to the relay to effect the operation thereof. By employing a suitable power or current responsive device in combination with the ohm relay, it is possible to effect a desired control in response to a predetermined one of these two operations of the ohm relay which may occur during each slip cycle while an out-of-step condition exists in the system. Such an arrangement is shown in Fig. 2 for effecting the opening of a circuit breaker in response to an out-of-step condition. In this Fig. 2, a circuit breaker 1 connects an alternating current generator 2 to an alternating current system 3. The circuit breaker 1 is shown as being of the latched closed type and as having a trip coil 4 which when energized is arranged to effect the opening of the circuit breaker 1. 5 represents an ohm relay which is connected to the system 3 at the point where the circuit breaker 1 is located and which relay is arranged in a manner known in the art to have the impedance characteristic XX' shown in Fig. 1 so that, as long as the voltage of the generator 2 leads the receiver voltage of the system 3 and the phase displacement of the voltage is within a predetermined range, namely, so that the impedance vector terminates to the right of the characteristic VV' in Fig. 1, the contacts 6 of the relay 5 are open. When, however, the load on the generator 2 exceeds such a value that it pulls the generator out of step, the end of the impedance vector moves along the locus PS in Fig. 1 from right to left as the lead of the generator voltage increases relative to the receiver voltage of the system until the point A is reached when the relay 5 closes its contacts 6 and maintains them closed until another predetermined phase angular displacement of the voltages occurs near phase coincidence when the relay 5 opens its contacts 6. The contacts 6 are connected in series with the trip coil 4 and also with the contacts 7 of a suitable overcurrent relay 8 which is connected in series relation with the generator 2 in any suitable manner so that the contacts 7 are closed only when the current supplied by the generator is above a predetermined value, which in turn is a value greater than the current that flows between the generator and the system under normal load conditions when the phase displacement of the voltages is small. Therefore, there is no possibility of the circuit breaker 1 being opened in case the relay 5 closes its contacts 6 during normal operating conditions because under such conditions the contacts 7 of overcurrent relay 8 are open.

Since the fault impedance characteristic OO' does not intersect the relay impedance characteristic XX', a fault does not cause the ohm relay 5 to close its contacts 6 and complete the trip circuit of the circuit interrupter 1. Furthermore, under normal operating conditions, the current output from the generator 2 is either too small to cause the overcurrent relay 8 to close its contacts 7 or the load impedance is such that the ohm relay 5 maintains its contacts 6 open. Therefore, only during the first slip cycle of an out-of-step condition, namely, when the lead of the generator voltage increases to approximately 210°, is the trip circuit of the circuit breaker 1 completed by the relays 5 and 8 to effect the disconnection of the generator 2 from the rest of the system.

The arrangement shown in Fig. 2 is satisfactory for power systems in which the power flow, at point where the relay arrangement is connected, is always in a given direction. In cases where the power may flow in either direction through the system, it is evident from Fig. 1 that the end of the impedance vector might move from left to right along the locus PS as the out-of-step condition progresses so that the contacts 6 of the ohm relay 5 would be closed from a small phase displacement of the voltages near phase coincidence until the generator voltage lags the receiver voltage approximately 150°. Therefore, under such conditions, the circuit breaker 1 in Fig. 2 would be tripped as soon as the phase displacements of the voltages had progressed far enough to cause sufficient current to flow through the system to operate the overcurrent relay 8. Such an operation could result in an undesirable operation of the circuit breaker 1.

In Fig. 3, I have shown a modification of the embodiment of my invention shown in Fig. 2 which effects a desired control operation in response to an out-of-step condition irrespective of the direction of power flow during the out-of-step condition. In this modification, I employ a second ohm relay 10 which is connected to the system at the same point as the ohm relay 5 and which has an impedance characteristic YY' similar to the impedance characteristic XX' except that it intersects the power swing locus PS at a different point B preferably on the other side of the electrical center C, as shown in Fig. 4.

In the modification shown in Fig. 3, the ohm relay 5 is provided with the contacts 6, as in Fig. 2, so that they are closed when the impedance vector terminates to the left of the impedance characteristic XX' in Fig. 4. The ohm relay 5 is also provided with the contacts 11 which are closed when the impedance vector terminates to the right of the impedance characteristic XX'. The ohm relay 10 is provided with contacts 12 which are closed when the impedance vector terminates to the right of the impedance characteristic YY' and with contacts 13 which are closed when the impedance vector terminates to the left of the impedance characteristic YY'. The contacts 6 and 13 are connected in series in an energizing circuit for an auxiliary relay 14 of the instantaneous pick-up time delay drop-out type, and the contacts 11 and 12 are connected in series in an energizing circuit for a similar auxiliary relay 15. Therefore, the relay 14 is energized when the impedance vector terminates to the left of the impedance characteristic XX', and the relay 15 is energized when the impedance vector terminates to the right of the impedance characteristic YY'. The relay 14 when energized closes its contacts 16 which are connected in an energizing circuit for the trip coil 4 through the contacts 7 of the overcurrent relay 8, the auxiliary contacts 18 of the circuit breaker 1 and the contacts 12 of the distance relay 10. Similarly, the relay 15 when energized closes its contacts 17 which are connected in an energizing circuit for the trip coil 4 through the contacts 7 of the overcurrent relay 8, the auxiliary contacts 18 of the circuit breaker 1 and the contacts 6 of the distance relay 5.

The operation of the modification shown in Fig. 3 is as follows: Under normal operating conditions, the impedance vector of the system will terminate either to the right of the impedance characteristic YY' or to the left of the impedance characteristic XX' depending upon which direction power is being transferred through the circuit breaker 1. For the purpose of this description, it will be first assumed that the normal transfer of power is such that the impedance vector terminates to the right of the impedance characteristic YY' in Fig. 4 so that the contacts 11 of the ohm relay 5 and the contacts 12 of the ohm relay 10 are closed and the contacts 6 of ohm relay 5 and the contacts 13 of the ohm relay 10 are open. Therefore, the energizing circuit for the auxiliary relay 15 is completed through the contacts 11 and 12 of the relays 5 and 10, respectively.

When an out-of-step condition occurs, the phase displacements of the system terminal voltages start to increase and, under the power flow conditions assumed, the system impedance vector moves along the power swing locus PS in Fig. 4 from right to left, and when it reaches the point B, the ohm relay 10 opens its contacts 12 and closes its contacts 13. The opening of the contacts 12 effects the deenergization of the auxiliary relay 15, but the contacts 17 of the relay 15 remain closed for a predetermined time after the relay becomes deenergized. As the out-of-step condition progresses, the system impedance vector reaches the point A when the ohm relay 5 opens its contacts 11 and closes its contacts 6. Since the time delay of relay 15 is made longer than the time it takes for the end of the impedance vector to move from point B to point A during an out-of-step condition, the closing of the contacts 6 of the ohm relay 5 completes the energizing circuit for the trip coil 4 through the contacts 17 of the relay 15, the auxiliary contacts 18 of the circuit breaker 1 and the contacts 7 of the overcurrent relay 8.

When a fault occurs on the system, the end of the impedance vector immediately moves to a point on or near the fault impedance characteristic 00' so that the relay 10 opens its contacts 12 and closes its contacts 13. No tripping of the circuit breaker 1 is effected, however, under these conditions because the impedance vector does not move to a point to the left of the impedance characteristic XX' in Fig. 4 so as to effect the opening of the contacts 11 and the closing of the contacts 6 of the ohm relay 5. Similarly, if the impedance characteristic YY' is so positioned that during a power swing the end of the impedance vector moves to a position to the left of this characteristic, and then returns to a position to the right thereof without crossing the impedance characteristic XX', no tripping of the circuit breaker 1 is effected.

If during normal operating conditions the power flow is such that the impedance vector terminates to the left of the impedance characteristic XX', the contacts 6 and 13 of the ohm relays 5 and 10, respectively, are closed so that the auxiliary relay 14 is deenergized. When a condition occurs which causes the system to fall out of step, the end of the impedance vector moves along the impedance locus PS from left to right, and when the end of the impedance vector reaches the point A, the ohm relay 5 opens its contacts 6 and closes its contacts 11 so that the auxiliary relay 14 becomes deenergized but the contacts 16 thereof remain closed for a predetermined time thereafter. When the end of the impedance vector reaches the point B on the locus PS during the out-of-step condition, the relay 10 opens its contacts 13 and closes its contacts 12 thereby completing the energizing circuit for the trip coil 4 through the contacts 16 of the auxiliary relay 14, the auxiliary contacts 18 of the circuit breaker 1 and the contacts 7 of the overcurrent relay 8.

From the above description, it will be seen that I have provided an arrangement which effects a desired control operation only in case the impedance vector in Fig. 4 moves from the right of the impedance characteristic YY' to the left of the impedance characteristic XX', or vice versa, within a predetermined time interval, which is a condition that occurs during an out-of-step condition but not during a power swing from which the system can recover without falling out of step or during a fault or any normal load condition.

One advantage in employing ohm relays having impedance characteristics which are substantially parallel with the fault impedance characteristic is that the electrical center of the system may vary over a wide area of the system, which is a condition that occurs in some electric power systems, without affecting the proper operation of my improved out-of-step relay arrangement.

When the relay arrangement shown in Fig. 3 is used on a power system provided with distance protective relaying equipment located at different points on the system and it is desired that only the circuit breaker equipped with the out-of-step relay arrangement shown in Fig. 3 shall open when an out-of-step condition occurs, it is only necessary to provide such of these other distance relay equipments, as include the electrical center within their respective reaches, with suitable well-known out-of-step relay blocking arrangements, examples of which are well known in the art, so that they do not effect the opening of their associated circuit breakers during an out-of-step condition.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. A relay arrangement for effecting a predetermined control operation at a desired point in an alternating current power system in response to an out-of-step condition on said system comprising an ohm relay arranged so that when it is connected to said system at said desired point it has on a resistance-reactance diagram for said system an impedance characteristic which is approximately parallel to the portion of the system impedance characteristic over which the electrical center may vary during actual operating conditions of the system, control means responsive to a predetermined operation of said relay, and means for preventing the operation of said relay when the current in said system at said point is below a predetermined value.

2. A relay arrangement for effecting a predetermined control operation at a desired point in an alternating current power system in response to an out-of-step condition on said system comprising two ohm relays arranged so that when they both are connected to said system at said desired point they respectively have on a resistance-reactance diagram for said system impedance characteristics which are approximately parallel to the portion of the system impedance characteristic between said desired point and the electrical center of the system and which are displaced relative to each other, and means responsive to a predetermined sequential operation of said relays for effecting said predetermined control operation.

3. A relay arrangement for effecting a predetermined control operation at a desired point in an alternating current power system in response to an out-of-step condition on said system comprising two ohm relays arranged so that when they both are connected to said system at said desired point they respectively have on a resistance-reactance diagram for said system impedance characteristics which are approximately parallel to the portion of the system impedance characteristic between said desired point and the electrical center of the system and which are on opposite sides of said system impedance characteristic, and means dependent upon a predetermined sequential operation of said relays for effecting said control operation.

4. A relay arrangement for effecting a predetermined control operation at a desired point in an alternating current power system in response to an out-of-step condition on said system comprising two ohm relays arranged so that when they both are connected to said system at said desired point they respectively have on a resistance-reactance diagram for said system impedance characteristics which are approximately parallel to the portion of the system impedance characteristic between said desired point and the electrical center of the system and which are displaced relative to each other, and means dependent upon the successive operation of both of said relays within a predetermined interval for effecting said control operation.

5. A relay arrangement for effecting a predetermined control operation at a desired point in an alternating current power system in response to an out-of-step condition on said system comprising two ohm relays arranged so that when they both are connected to said system at said desired point they respectively have on a resistance-reactance diagram for said system impedance characteristics which are approximately parallel to the portion of the system impedance characteristic between said desired point and the electrical center of the system and which are displaced relative to each other, and means dependent upon the current in said system at said point exceeding a predetermined value and the successive operation of both of said relays within a predetermined interval for effecting said control operation.

6. A relay arrangement for effecting a predetermined control operation at a desired point in an alternating current power system in response to an out-of-step condition on said system comprising two ohm relays arranged so that when they both are connected to said system at said desired point they respectively have on a resistance-reactance diagram for said system impedance characteristics which are approximately parallel to the portion of the system impedance characteristic between said desired point and the electrical center of the system and which are on opposite sides of said impedance characteristic, and means for effecting said control operation in response to an operation of one of said relays occurring within a predetermined time after an operation of the other relay.

7. A relay arrangement for effecting a predetermined control operation at a desired point in an alternating current power system in response to an out-of-step condition on said system comprising two ohm relays arranged so that when they both are connected to said system at said desired point they respectively have on a resistance-reactance diagram for said system different impedance characteristics which are approximately parallel to the portion of the system impedance characteristic between said desired point and the electrical center of the system, a timing device, means for initiating the timing operation of said device in response to a predetermined operation of one of said ohm relays, means responsive to the operation of the other ohm relay after said timing operation has been initiated but before it is completed for effecting said control operation, a second timing device, means for initiating the operation of said second timing device in response to a predetermined operation of said other ohm relay, and means responsive to the operation of said one of said ohm relays after the timing operation of said second timing relay has been initiated but before it is completed for effecting said control operation.

8. A relay arrangement for effecting a predetermined control operation at a desired point in an alternating current power system in response to an out-of-step condition on said system comprising two ohm relays arranged so that when they both are connected to said system at said desired point they respectively have on a resistance-reactance diagram for said system impedance characteristics which are approximately parallel to the portion of the system impedance characteristic between said desired point and the electrical center of the system and which are displaced relative to each other, two time relays of the instantaneous pick-up time delay drop-out type, means controlled by said ohm relays for completing an energizing circuit for one of said time relays when one of said ohm relays is in a predetermined one of its two operating positions and the other of said ohm relays is in a predetermined one of its two operating positions, means controlled by said ohm relays for completing an energizing circuit for the other of said time relays when both of said ohm relays are simultaneously in their other operating positions, means controlled by said one of said time relays and said one of said ohm relays for effecting said control operation in response to the operation of said one of said ohm relays while said one of said time relays is in its energized position, and means controlled by said other time relay and said other ohm relay for effecting said control operation in response to the operation of said other ohm relay while said other time relay is in its energized position.

9. A relay arrangement for effecting a predetermined control operation at a desired point in an alternating current power system in response to an out-of-step condition on said system comprising two ohm relays arranged so that when they both are connected to said system at said desired point they respectively have on a resistance-reactance diagram for said system impedance characteristics which are approximately parallel to the portion of the system impedance characteristic between said desired point and the electrical center of the system and which are displaced relative to each other, two time relays of the instantaneous pick-up time delay drop-out type, means controlled by said ohm relays for completing an energizing circuit for one of said time relays when one of said ohm relays is in a predetermined one of its two operating positions and the other of said ohm relays is in a predetermined one of its two operating positions, means controlled by said ohm relays for completing an energizing circuit for the other of said time relays when both of said ohm relays are simultaneously in their other operating positions, means controlled by said one of said time relays and said one of said ohm relays for effecting said control operation in response to the operation of said one of said ohm relays while said one of said time relays is in its energized position, means controlled by said other time relay and said other ohm relay for effecting said control operation in response to the operation of said other ohm relay while said other time relay is in its energized position, and means controlled by the current in said system at said point for preventing said control operation being effected by said ohm relays when said current is below a predetermined value.

ALBERT R. van C. WARRINGTON.